United States Patent [19]
MacWade et al.

[11] B 3,914,677
[45] Oct. 21, 1975

[54] PRECISION MOTION CONTROL DEVICE OR THE LIKE

[75] Inventors: Robert W. MacWade, Philadelphia; Bernard J. McDevitt, Norristown, both of Pa.

[73] Assignee: Sperry Rand Corporation, Blue Bell, Pa.

[22] Filed: June 8, 1973

[21] Appl. No.: 368,397

[44] Published under the Trial Voluntary Protest Program on January 28, 1975 as document no. B 368,397.

[52] U.S. Cl. ............ 318/561; 318/617; 318/640; 318/681
[51] Int. Cl.² ........................................ G05B 13/00
[58] Field of Search .......... 318/561, 617, 640, 681

[56] References Cited
UNITED STATES PATENTS

| | | |
|---|---|---|
| 3,673,977 | 7/1972 | Hendley .................... 318/640 X |
| 3,721,882 | 3/1973 | Helms ....................... 318/594 |
| 3,728,668 | 4/1973 | Brette ....................... 318/617 X |
| 3,731,177 | 5/1973 | Commander et al. ..... 318/561 X |

*Primary Examiner*—G. Z. Rubinson
*Attorney, Agent, or Firm*—Charles C. English

[57] ABSTRACT

A paper advance system for a high speed printer is provided and includes an electronic counter which is initially set to store a sprocket pulse count indicative of the number of lines of paper advance to be executed. The sprocket pulse count stored in the counter is a multiple of the number of lines of paper to be advanced. A servo mechanism is connected to the counter and controls the paper advance mechanism of the printer. A sprocket pulse generator which generates a plurality of sprocket pulses for each line of paper advance is used to decrement the counter to zero where the servo mechanism is de-energized and the paper advance is halted.

9 Claims, 13 Drawing Figures

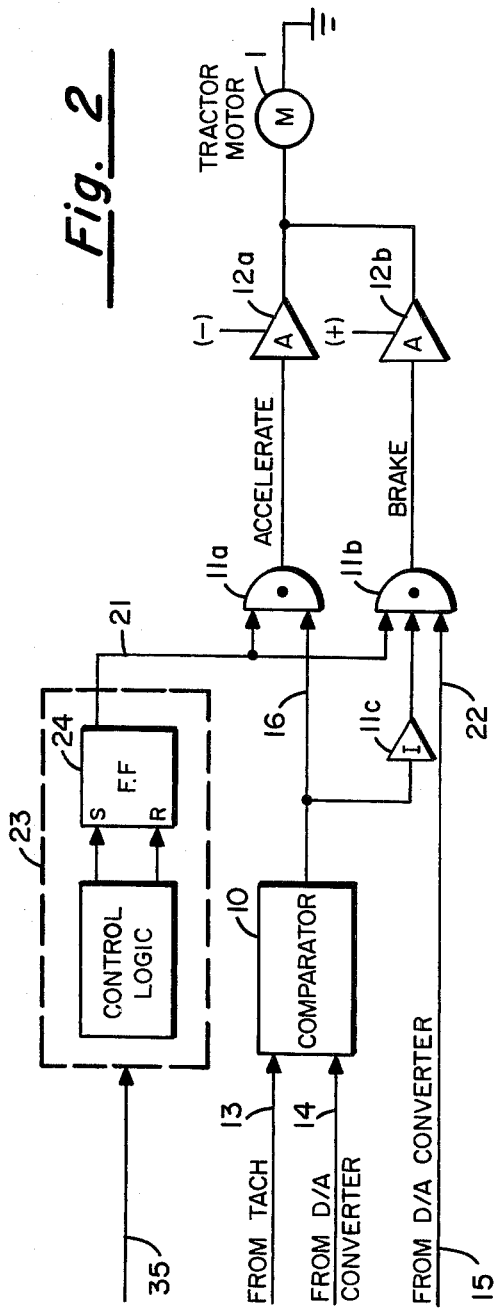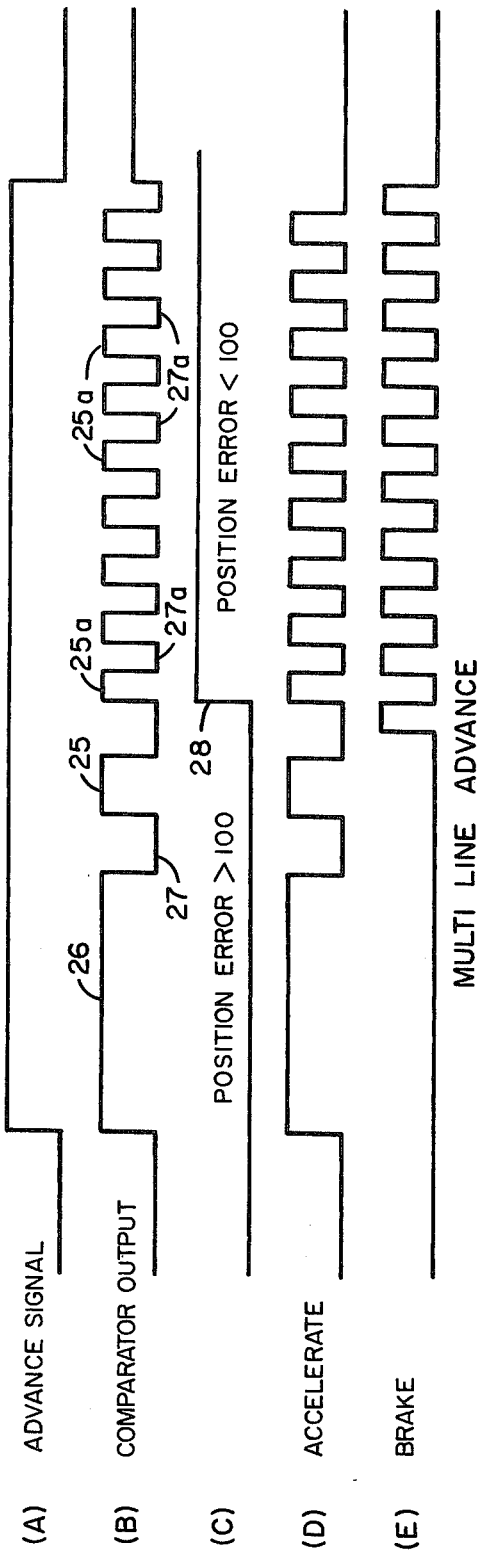

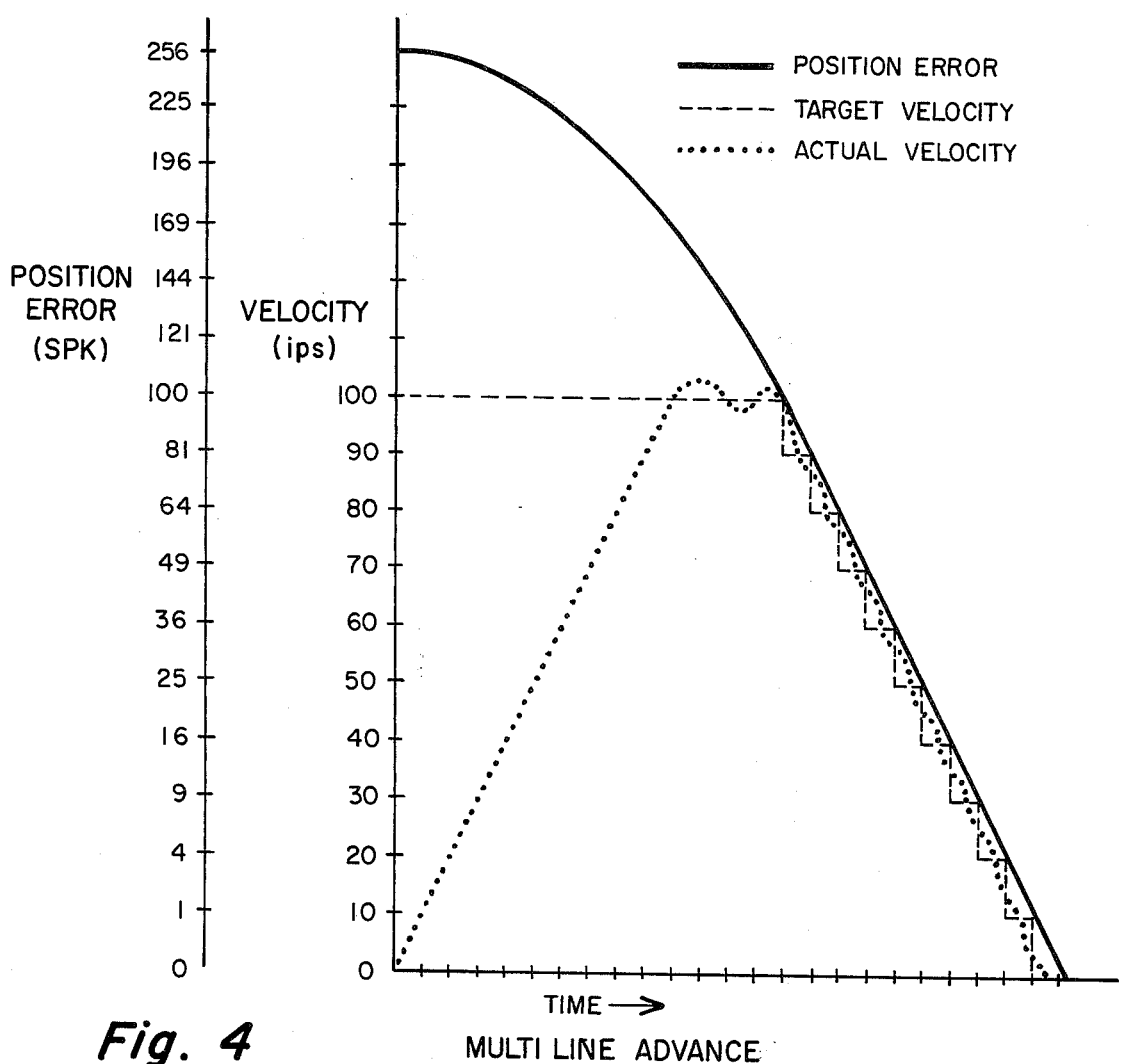
Fig. 4  MULTI LINE ADVANCE
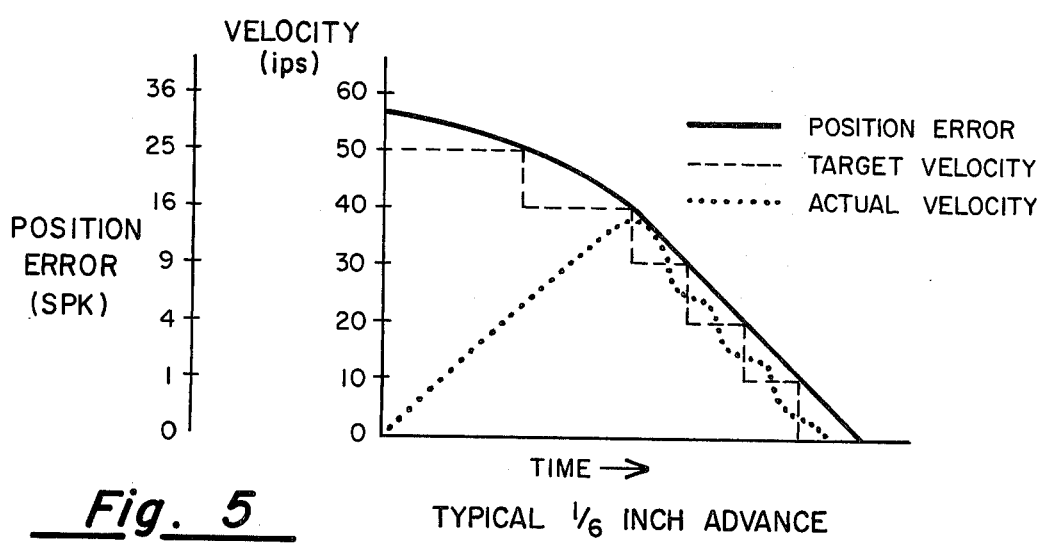
Fig. 5  TYPICAL 1/6 INCH ADVANCE

PRECISION MOTION CONTROL DEVICE OR THE LIKE

BACKGROUND OF THE INVENTION

High speed, precision motion control devices represent an area of continuing interest in the development of high speed, computers. Such devices are, for example, used to control the positioning of a magnetic head over a magnetic disc or drum. Another example of the use of such devices is in the control of the paper feed in high speed printer mechanisms. This invention is directed in particular to the provision of a servo controlled high speed precision paper feed mechanism for a high speed printer.

Servo controlled paper feed devices are not new per se. For example, one type of system known to applicants utilizes an electric motor to drive the paper advance tractors of the printer; a servo network coupled to the motor to control its velocity; a counter which is set to a count corresponding to the number of lines it is desired to advance paper; and a signal converter which converts the output of the counter into an error voltage to drive the servo network. In this system a sprocket wheel is coupled to the paper advance tractors of the high speed printer and as the tractors advance the paper, the sprocket wheel generates a sprocket pulse for each line of paper advance. The resultant sprocket pulse is then used to decrement the counter one count for each line of paper advance. When the counter has been decremented to zero the error output voltage from the signal converter goes to zero and the servo mechanism is brought to a halt to stop the paper advance.

In at least one such system in the prior art, the signal converter operates to generate an error voltage which has a first amplitude whenever the paper is to be advanced over more than one line. This error voltage causes the servo mechanism to operate at a first speed. After the counter has been decremented to a count of unity the signal converter produces an error voltage which has a second lower amplitude. This latter error voltage causes the servo mechanism to operate the tractor advance motor at a second lower speed until the counter has been decremented to zero at which time the tractor motor is de-energized and further paper advance is stopped.

The present invention operates on a somewhat similar principle and yet differs, inter alia, from the prior art in that the velocity of the paper advance is varied as an exponential function of the distance between the present position of the paper and its ultimate position. In more particular, the velocity of the paper advance below a preselected maximum velocity is made to follow the expression:

$$V = (d)^{1/2} V_1$$

where, $V$ equals the instantaneous velocity of the paper advance;

$d$ is equal to the number of distance units between the present position of the paper and its ultimate position, and $V_1$ equal the velocity of paper advance when $d$ equals unity.

In the preferred embodiment the value of $(d)^{1/2}$ is varied in steps in accordance with the smallest integral square root value of $d$. For example, $(d)^{1/2} = 3$ for values of $d$ ranging from 9 to 15 units; $(d)^{1/2} = 4$ for values of $d$ ranging from 16 to 24 units, and so forth.

By utilizing this type of velocity control, the velocity of paper advance during stopping is made to decrease in a series of uniform steps, with each step occurring after progressively smaller distance intervals of paper advance have been traversed. By so controlling the velocity of paper advance, paper can be moved at high rates of speed and made to stop rapidly at precisely controlled printing positions.

It is accordingly an object of this invention to provide a reliable high speed paper advance mechanism which permits paper to be moved through a wide range of distances quickly and then stopped at precisely controlled positions.

It is another object of the invention to provide a means for easily correcting misalignments which may occur in the paper printing positions.

Other objects and features of the invention will become apparent as the present description proceeds. IN THE DRAWINGS:

FIG. 2 is a block diagram of the accelerate-decelerate circuit shown in FIG. 1 illustrating in somewhat more detail the interconnection of this circuit to the motor drive circuit 12 of FIG. 1;

FIG. 3 shows a set of waveforms useful in explaining the operation of FIG. 2;

Figure 1:
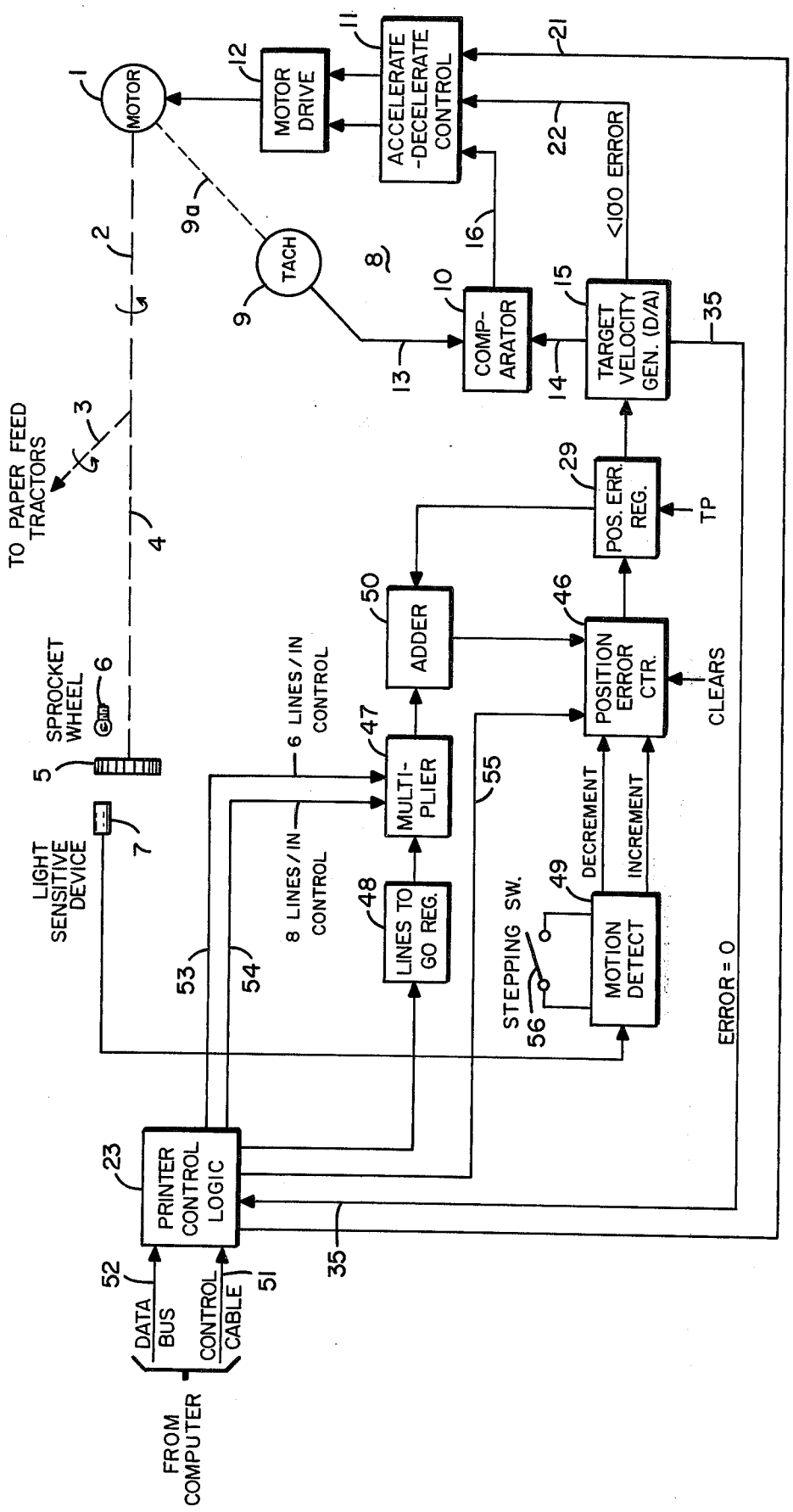
FIG. 1 is an overall block diagram of the present invention.
Figure 6:
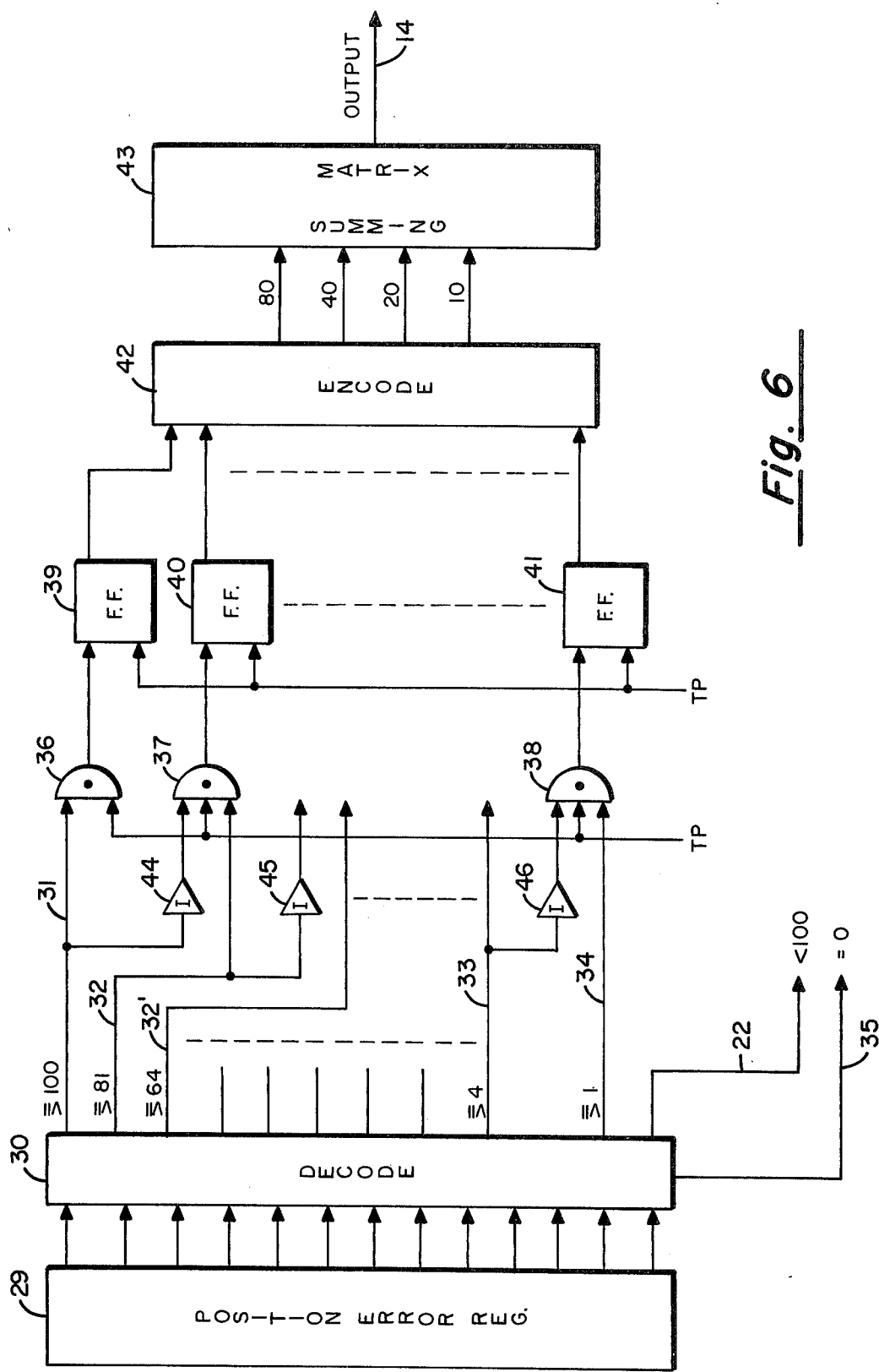
Figure 7:
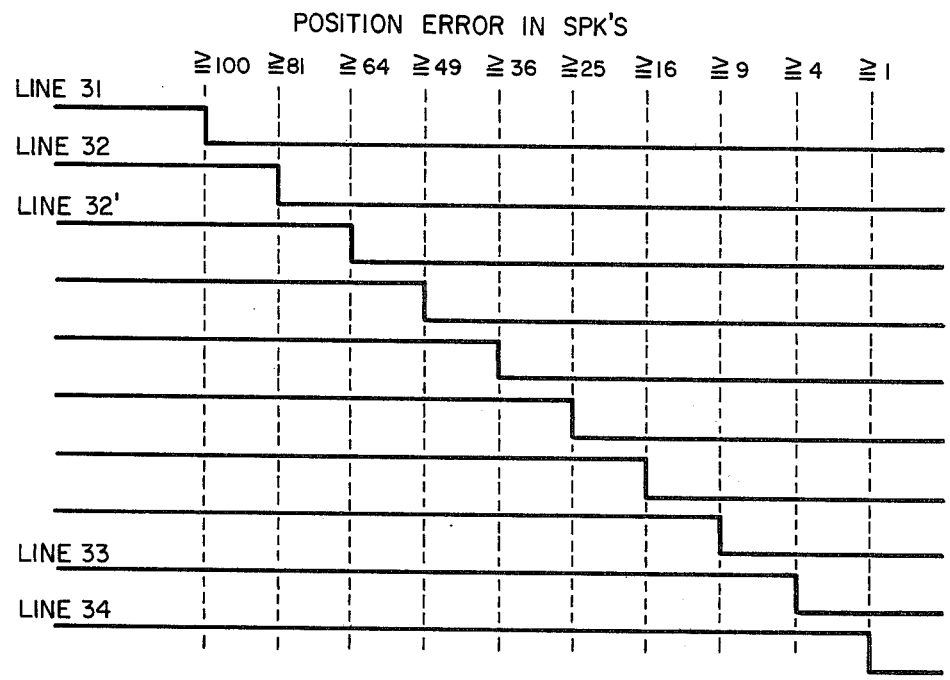
Figure 8:
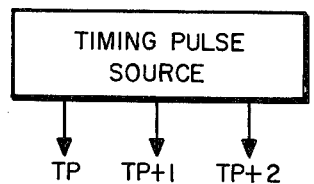
Figure 8A:
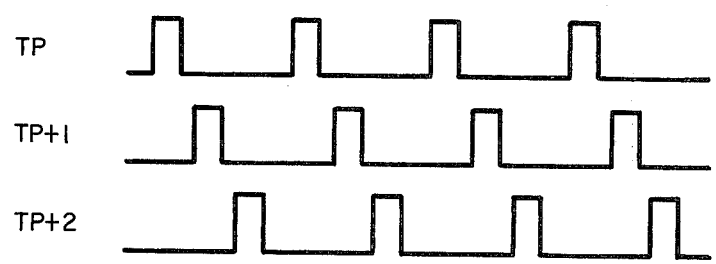
Figure 9:
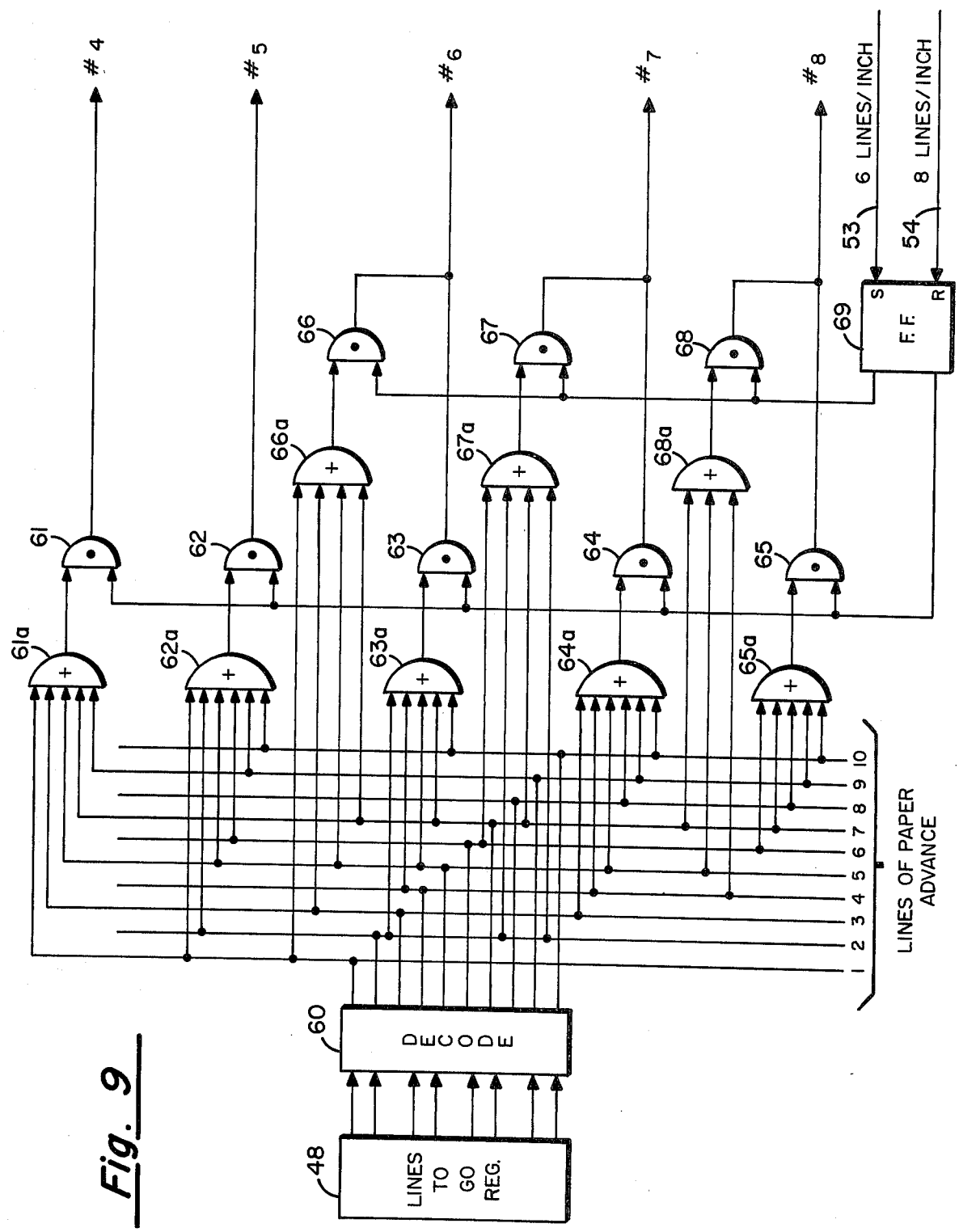
Figure 10:
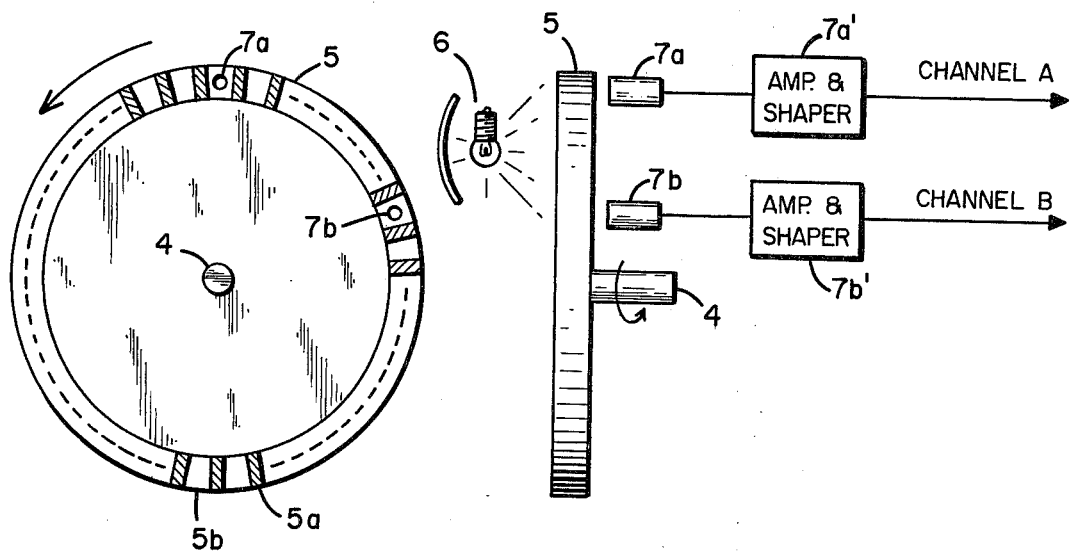
Figure 11:
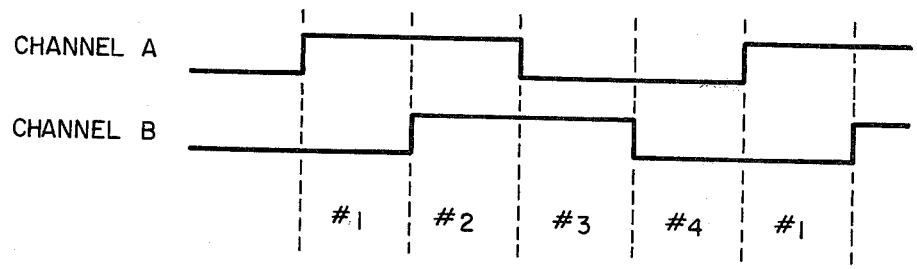
Figure 12:
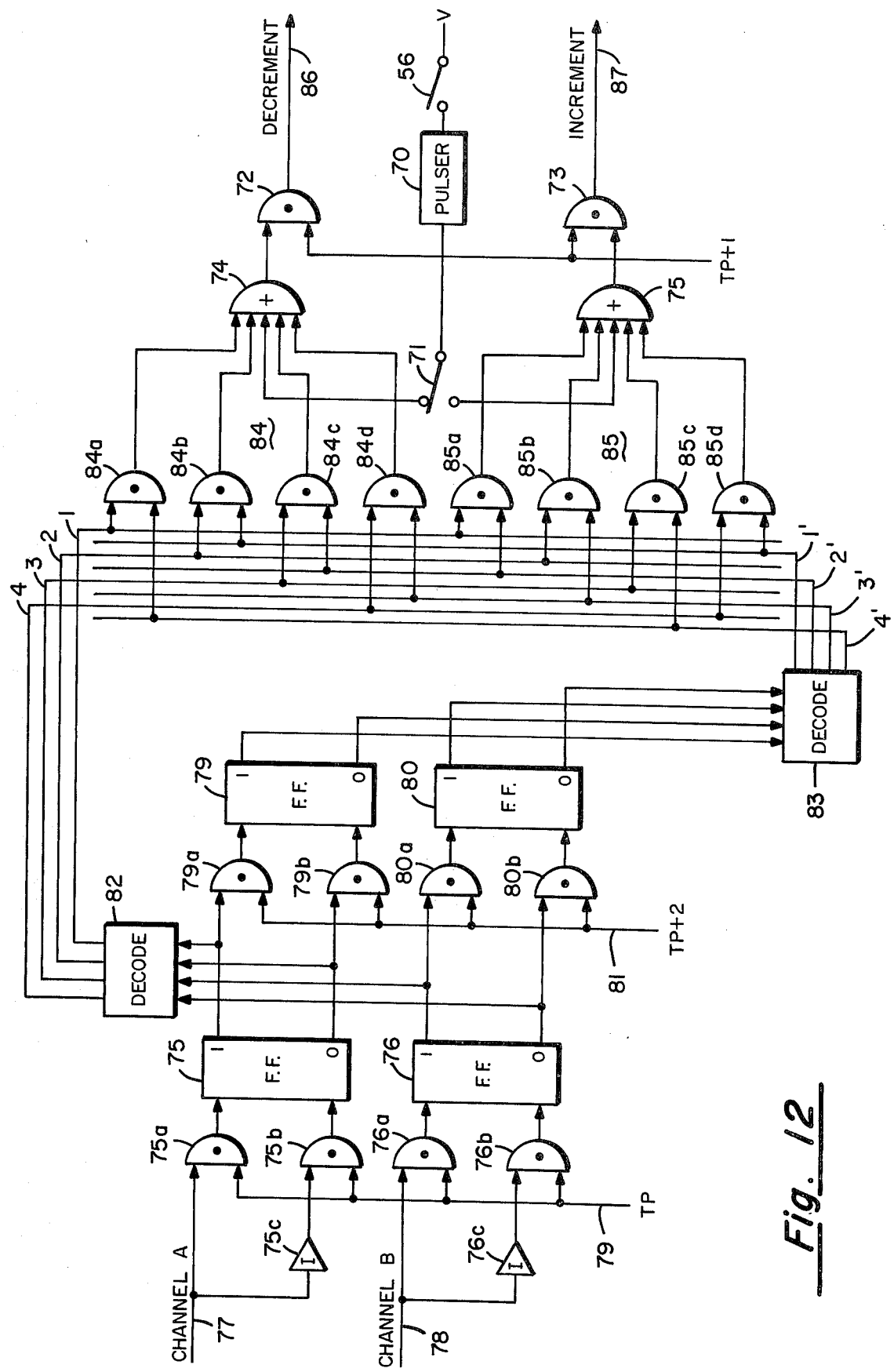

FIGS. 4 and 5 comprise a set of graphs useful in explaining the operation of the invention during a multiple line and a single line advance respectively;

FIG. 6 is a block diagram of one typical D/A converter which could be used in this invention;

FIG. 7 is a set of waveforms useful in explaining the operation of FIG. 6;

FIG. 8 is a symbolic representation of a timing pulse source used in this invention;

FIG. 8a shows a set of typical timing pulses produced by the source shown in FIG. 8;

FIG. 9 is a simplified diagram of an illustrative multiplier 47 shown in FIG. 1;

FIG. 10 is a diagram of the sprocket pulse generator system;

FIG. 11 shows a set of sprocket pulses generated by the sprocket pulse circuit of FIG. 10; and FIG. 12 shows the motion control circuit in FIG. 1.

SUMMARY OF INVENTION

The present invention comprises a servo network for controlling the paper advance motor of a high speed printer. The servo network is energized by a digital-to-analog converter which in turn is controlled by a position error counter. The position error counter is set, by an input (typically) from a computer, to a value which indicates the number of lines it is desired to advance paper. Specifically, the position error counter is set to a sprocket pulse count which is a multiple of the number of lines of paper advance. A sprocket pulse generator which is ganged to the paper advance motor and rotated thereby generates a series of sprocket pulses for each line of paper advanced and these pulses decrement the position error counter. Whenever the position error counter contains a count greater than a predetermined number of sprocket pulses, it causes the digital-to-analog converter to generate a maximum error voltage which in turn causes the servo mechanism to bring the paper advance motor up to a predetermined maximum velocity. As the position error counter is decremented by the sprocket pulse generator, it reaches a second predetermined count which causes the output of the digital-to-analog converter to step to a second error voltage level reducing the speed of the paper advance motor to a second level. Then after the position error counter has been decremented to a third predetermined count, the digital-to-analog converter operates to produce a third error voltage level which reduces the velocity of the paper advance to a third velocity level. This action of reducing the velocity of the paper advance motor in steps continues until a zero count is obtained in the position error counter. At this time the servo mechanism is de-energized and the paper is brought to a halt.

To provide for highly precise positioning of the paper, the sprocket pulse generator is designed to produce 192 sprocket pulses per inch of paper advance. This corresponds to 24 sprocket pulses per line during an 8 line per inch advance mode or 32 sprocket pulses per line during a 6 line per inch advance mode. By requiring a large number of sprocket pulses for each line of paper advance, a very fine control over the positioning accuracy of the paper can be obtained. Also, through the formation of a step-wise deceleration curve for the velocity control of the paper advance motor, the paper advance can be highly controlled and brought rapidly to a smooth and gentle halt from a very high velocity level.

DESCRIPTION

FIG. 1 to which reference is now made, shows organizationally the structure of the present invention. In this figure the tractor motor for advancing the print paper of the high speed printer is shown at 1. This motor which may be a conventional high torque D. C. motor, is coupled through a shaft shown by the dashed lines 2 and 3 to a set of conventional paper feed tractors not shown. Also coupled to the shaft 2 through an extention thereof, as indicated by the dashed line 4, is a sprocket wheel 5. Typically this sprocket wheel can be of an optical type which has a light source 6 associated therewith and a light sensitive device such as a diode 7. The sprocket wheel 5 as previously mentioned is arranged to generate 192 pulses per inch of paper advance. In the preferred embodiment, the sprocket wheel 5 makes one complete revolution for 4 inches of paper advance so that the sprocket wheel contains 768 sprocket positions (192 × 4).

Associated with the tractor motor 1 and designed to control its energization is a servo network generally indicated at 8. This network includes a D.C. tachometer 9 coupled to the motor 1 by shaft 9a and driven thereby. The tachometer 9 generates a signal whose level or amplitude is a function of the speed of the motor 1 and whose polarity is a function of the direction of rotation of the motor 1. Also included in the servo control network is a voltage comparator 10 which may include, inter alia, a conventional differential amplifier having two inputs 13 and 14 coupled thereto. Comparator 10 produces an output signal which has either a high level or a low level output depending upon the relative amplitudes of its respective inputs. In the present configuration the output of the tachometer 9 is applied to one input 13 of the comparator 10 while the output of a target velocity generator or a digital-to-analog converter 15 is applied to the second input 14 of the comparator. When the output of the tachometer 9 exceeds the output of the D/A converter 15 the comparator 10 produces a D.C. output of one polarity indicating that the speed of the motor 1 is too high. When the reverse situation prevails, that is where the converter 15 output exceeds that produced by the tachometer 9, the comparator 10 produces a second output of the opposite polarity indicating that the speed of the motor 1 is too low. The output of the comparator which appears on line 16 is applied to an accelerate-decelerate control network 11. This network together with the motor drive circuit 12 is shown in more detail in FIG. 2 and will be subsequently described. The function of the accelerate-decelerate control circuit 11 and the motor drive circuit 12 is to sense the polarity of the output from the comparator 10 and to increase the velocity of the paper drive tractor motor 1 in response thereto.

As alluded to hereinabove, the purpose of the digital-to-analog converter 15 is to convert a digital signal representing the number of lines that the paper is yet to be moved, into an analog voltage. This voltage is then used to establish the target velocity of the tractor motor 1. The action of the D/A converter 15 in establishing the velocity of the motor 1 is shown in FIG. 4 where a typical multi-line advance is represented, and in FIG. 5 where a single-line advance is represented. In these figures the positional error (expressed as sprocket pusles) is shown as a solid line curve. The target velocity or error voltage generated by the converter 15 is represented by the dashed line curve, while the actual velocity (tachometer 9 voltage) achieved by the tractor motor 1 under control of the servo network 8 is shown by the dotted line curve.

As more clearly shown in FIG. 4 the present system is designed so that the maximum velocity of paper advance is 100 inches per second. The converter 15 is thus designed to generate an error voltage which will produce this speed of paper advance whenever the positional error (paper advance) exceeds a preselected value. The preselected value in the illustrated embodiment corresponds in the present illustration to 100 sprocket pulses or approximately 500 mils of paper advance. FIG. 4 assumes that a paper advance of 8 lines is called for and that the printer is in its 6 line per inch mode. This paper advance corresponds to a positional error of (8 × 32)=256 sprocket pulses, and as will later be described the position error counter 46 and error register 29 which stores the count of the counter 46 are set to a count of 256. The D/A converter 15 which also will later be described and which is driven by the error register 29 detects that the paper advance exceeds 100 sprocket pulses and initially establishes a target velocity voltage of 100 inches per second as shown by the dashed line curve. Initially then, the output of the digital-to-analog converter 15 is such as to cause the tractor motor 1 to accelerate as indicated by the positively sloped portion of the dotted curve shown in FIG. 4. When the velocity of the motor 1 reaches 100 inches per second as indicated at point 17 in FIG. 4, the deceleration-acceleration control circuit 11 and motor drive circuit 12 operate to permit the servo mechanism to coast until the motor 1 speed reaches point 18 in FIG. 4. At this point the target velocity exceeds the actual velocity and the motor 1 is again accelerated until point 19 is reached. At this point the motor 1 speed again exceeds the target velocity and the motor 1 is again permitted to coast. All during this time the position error counter 46 and hence the count stored in register 29 is being decremented and the positional error is decreasing as shown by the solid line curve. Finally at point 20 the positional error drops below a 100 sprocket pulse count. At this point the digital-to-analog converter 15 detects that the position error register 29 is storing a sprocket count of less than 100 and steps its output down to a second target velocity indicated as 90 inches per second. At this point the actual velocity of the motor 1 as represented by the tachometer 9 output exceeds the target velocity voltage established by the D/A converter 15. The comparator 10 detects this fact and causes the accelerate-decelerate control 11 to apply a braking signal to the motor 1. This in turn causes the actual velocity curve as shown by the dotted line to reduce its level quickly to 90 inches per second. Shortly thereafter the position error drops to value below 81 but above 64 sprocket pulse count. The D/A Converter 15 detects this event and produces a target velocity of 80 inches per second. This stepwise reduction in velocity continues until the positional error is reduced to zero at which time the motor 1 is brought to a halt.

It will thus be seen that by forming the digital-to-analog converter 15 so that its deceleration curve follows a step function as indicated in FIG. 1 a smooth yet rapid deceleration can be provided to the tractor motor 1. In one embodiment of the invention the target velocity is decremented in steps of 10 inches per second until the velocity reaches zero. Ideally, these velocity decrements follow the foregoing expression:

$$V = (d)^{1/2} V_1$$

where d is equal to the sprocket pulse count in register 29 and $V_1$ is the target velocity when $(d)^{1/2}$ equal unity.

For example, note that as shown in FIGS. 4 and 5 $(d)^{1/2}$ is made equal to 3 for sprocket error counts from 9 through 15, and is made equal to 4 for sprocket error counts of 16 through 24 and so on. To summarize, for sprocket error counts of 100 and above the maximum velocity of paper advance is equal to 100 inches per seconds; for sprocket error counts equal to 81 to 99 the target velocity of paper advance is made equal 90 inches per second; and for a sprocket error count from 64 to 81 a target velocity of paper advance of 80 inches per second obtains, and so on.

An advantage with the present type of velocity control is shown in FIG. 5, where a sprocket error less than 100 is assumed. In this case the actual velocity of the paper advance motor 1 is brought up to a level which depends on the initial sprocket count error and then rapidly decelerated to zero passing through only those velocity decrementing steps that are necessary to bring the paper advance to a smooth but rapid halt. For example, in FIG. 5 where a one line 6 per inch advance is assumed, a sprocket error count of 32 is initially established. An error count of 25 to 35, as shown in FIG. 5, corresponds to a maximum target velocity of 50 inches per second. The paper advance is started and the velocity increases along the dotted curve. At some point along the positive slope portion of the dotted curve, the actual velocity will exceed the target velocity and the motor 1 will then be rapidly decelerated to a halt. In the graphical illustration of FIG. 5 this is shown to occur when the actual velocity exceeds about 35 inches per second.

Clearly then for paper advances corresponding to 100 sprocket pulse count or less the paper advance motor 1 need only be accelerated to some intermediate maximum velocity from which deceleration begins immediately.

Before completing the description of FIG. 1 a number of the components making up FIG. 1 will be described. First the interaction of the accelerate-decelerate control 11 and the motor drive 12 circuit will be described in connection with FIGS. 2 and 3.

As shown in FIG. 2, the motor drive circuit 12 comprises a pair of oppositely poled class C amplifiers 12a and 12b connected to the armature winding of the drive motor 1. These amplifiers are arranged so that when amplifier 12a is actuated it will drive current through motor 1 in a direction that accelerates the motor while when amplifier 12b is actuated it will force current through motor 1 in the opposite direction to thereby brake the motor 1. Connected to the inputs of the amplifiers 12a and 12b are a pair of "AND" gates 11a and 11b. Gate 11a receives the direct output from comparator 10 on line 16 while gate 11b receives the inverted output of comparator 10 from inverter 11c. Both gates 11a and 11b receive the set output of flip-flop 24 which conditions gate 11a and partially conditions gate 11b. Gate 11b is also connected to line 22 which goes high whenever the positional error is less than 100 sprocket pulse count as will be later described. As shown by Waveform B of FIG. 3 the output 16 of the comparator 10 will be at a high level 26 whenever the output of the tachometer 9 appearing on line 13 is lower than the target level voltage appearing on line 14 from the D to A converter 15. Conversely, whenever the output from the D to A converter is less than that from the output of the tachometer 9, then the comparator 10 output will drop to its low level as shown at 27 in FIG. 3. Relating Waveform B of FIG. 3 to the graph of FIG. 4 it will be seen that the initial long period of high level output 26 from the comparator 10 persists until point 17 in FIG. 4 is reached, at which time and between points 17 and 18 of FIG. 4 the output of the comparator is low as shown at 27 in Waveform B of FIG. 3. Similarly when the actual velocity again drops below the target velocity between points 18 and 19, FIG. 4, the comparator again generates a high level output as shown at 25 in FIG. 3.

The output from the comparator 10 as shown by Waveform B in FIG. 3 is applied to the first "AND" gate 11a directly through line 16 and through the inverter 11c to the second "AND" gate labeled 11b. Gate 11a is conditioned from a flip-flop 24 in the print control logic 23. Flip-flop 24 is set as hereinafter described whenever a paper advance is to be executed, and then reset when the position error is equal to zero. That is when the paper has reached its desired position. Gate 11b receives in addition to the output from inverter 11c and the set output from flip-flop 24 a position error signal on line 22 from the D/A converter 15 such as shown by Waveform C in FIG. 3. In more particular, whenever the position error count is greater than 100 sprockets the (D/A) converter 15 applies a low level signal to gate 11b on line 22. This signal blocks the gate 11b. Then whenever the position error drops below 100 sprocket counts the signal level on line 22 from the converter 15 goes high as shown in FIG. 3 and gate 11b becomes energized or enabled. At the start of a paper advance operation the printer control logic 23 acts to set flip-flop 24 which generates on line 21 an advance signal as shown by Waveform A in FIG. 3. The set output of flip-flop 24 operating through line 21 conditions gate 11a to permit the high output of the comparator 10 to pass through. At the start of the paper advance operation, the output of the comparator 10 will be at its high level as shown at 26 in FIG. 3 since the output of the D/A converter 15 will exceed the output from the tachometer 9. This high level signal passes through gate 11a as Waveform D (FIG. 3) to energize the class C amplifier 12a which causes current to flow in one direction through the motor 1 to bring it up to speed. During the time that the positional error is greater than 100 sprocket pulses, line 22 is held at a low level as shown by Waveform C of FIG. 3 and gate 11b is blocked. Then when the velocity level of the tractor motor 1 reaches point 17 in FIG. 4 the comparator output drops to a low level as shown at 27 in Waveform B, FIG. 3. At this point since gate 11b is still being disabled by the low-level signal on line 22, neither gate 11a or 11b pass signals and the motor 1 is permitted to coast between points 17 and 18 of FIG. 4. Then when the speed of the motor 1 as measured by the tachometer 9, drops below the target speed as between points 18 and 19 in FIG. 4 the level of the output from the comparator 10 again goes high as shown at 25 in FIG. 3. The high level signal 25 passes through gate 11a to again accelerate the motor 1. It will thus be apparent from Waveform D and E (FIG. 3) that until the positional error has been reduced to a count below 100 sprockets only gate 11a will be active and the output from comparator 10 will operate to cause the motor 1 to alternately accelerate and coast. Then when the positional error drops below 100 sprocket counts a positive braking action occurs through the operation of gate 11b and the motor 1 is brought to a rapid but gentle stop. In other words the operation of acceleraton and coasting alternates back and forth until the sprocket count error stored by the position error counter 46 and hence the register 29 drops below 100. At this point when the positional error has dropped below a sprocket count of 100 the signal on line 22 switches to its high level shown at 28 in Waveform C of FIG. 3 and the gate 11b becomes enabled. Thereafter the high level outputs 25a from the comparator 10 are passed through gate 11a (Waveform D) to the accelerate line of the motor drive and the low level outputs 27a from comparator 10 which have been inverted by inverter 11C pass through gate 11b (Waveform E) to the brake line of the motor drive.

The digital-to-analog converter 15 which will now be described may be of conventional design and one illustrative arrangement of such a device is shown in FIG. 6 to which reference is now made. As shown in this figure, the digital-to-analog converter comprises a conventional decoding network 30 which receives the output from the position error register 29. The latter register is a flip-flop register which contains as many stages as is necessary to store the maximum sprocket error count to be accommodated by the system.

For purposes of illustration an eight stage register has been assumed. Although in practice a register having as many as 14 stages may be used. Using an eight stage binary register means that sprocket error counts up to 255 can be stored. The output of each of the 8 flip-flops comprising the error register 29 is applied as indicated to the decode network 30. The latter element 30 is also of conventional design and has at least 10 output lines 31 through 34 which are connected so that whenever the sprocket count stored in the position error register 29 is greater than 100 all of the output lines 31 through 34 (ten lines) will be set to a high level condition. When, however, the sprocket count stored in the register 29 drops below 100 but is still higher than 81 then lines 32 through 34 (nine lines) will be set to their high level condition while line 31 is set to a low level condition. Similary, when the sprocket count stored in register 29 drops below 81 but is still higher than 64, lines 32' through 34 (eight lines) will be in a high level condition while lines 31 and 32 (two lines) will be in a low level condition. The schedule of energization of the output lines from the decoder 30 is shown in FIG. 7. As shown in this figure, line 31 switches to its low level condition whenever the sprocket count stored in the position error register 29 drops below 100. Similarly, line 32 switches to its low level condition whenever the sprocket count drops below 81 and so on.

Each of the ten output lines 31 through 34 from the decoder 30 is connected to a set of ten "AND" gates 36 through 38 so that line 31 is connected directly to gate 36 and also through inverter 44 to gate 37. Similarly, line 32 is connected directly to gate 37 and through an inverter 45 to the next lower order gate not shown. This schedule of gate connections continues through to the bottom most gate 38 which is connected through an inverter 46 to line 33 and also directly to line 34 which represents a sprocket count error of 1 or above. It will be apparent then that decoder 30 renders the gates 36 through 38 active one at a time in sequence as the sprocket error count is decremented from above 100 to zero. Each of the gates 36 through 38 also receives a periodic timing pulse on the line labeled TP. As will be described the timing pulse TP is a high frequency pulse which acts to periodically strobe the gates 36 through 38, so that as these gates are rendered active one at a time the periodic timing pulse TP will be switched to the output of the active gate.

The TP output pulses of the ten "AND" gates 36 through 38 are respectively coupled to the set input side of each of ten flip-flops 39 through 41. These flip-flops also receive periodic timing pulses TP on their common reset line and the design of the flip-flops is such that a set input overrides the reset input. Thus all of the flip-flops are normally reset except whenever a flip-flop receives both set and reset inputs. In that case the flip-flop is set and stays set until it loses its set input. These flip-flops correspond, whenever they are set, to velocities ranging from 100 inches per second for flip-flop 39 to 10 inches per second for flip-flop 41.

The set outputs of each of these ten flip-flops is coupled through a conventional encoder 42 to four output lines labeled 10, 20, 40 and 80. The encoder 42 operates such that when flip-flop 39 is set representing a velocity of 100 inches per second, the encoder 42 energizes both its 20 and 80 output lines. Similarly, when flip-flop 40 is set, representing a velocity of 90 inches per second, the encoder 42 acts to energize the output lines 10 and 80 and so on with each of the ten flip-flops 39 to 41 energizing one or more of the output lines 10, 20, 40 and 80 to represent the velocity steps ranging from 10 to 100.

The four outputs of the encoder 42 are applied to a signal summing matrix 43. Matrix 43 in turn responds to these inputs to provide a signal on output line 14 which varies in discrete levels in dependence upon the input signal combination. These output signal levels correspond to the ten velocity steps ranging from zero to 100 inches per second.

For control purposes the decoder 30 also produces on an output line 22 a signal level which is initially low whenever the sprocket count stored in the error position register 29 is greater than 100 and a high level signal whenever the sprocket count stored in the position register 29 is less than 100. This signal corresponds to the signal shown by Waveform C in FIG. 3 and is applied to gate 11b of FIG. 2.

Again for control purposes the decoder 30 also provides on another output line 35 a signal which indicates whenever the decoded output from the error position register 29 corresponds to a position error of zero. This signal is applied to the printer logic circuit 23 and is used to cause the termination of the advance signal (Waveform A, FIG. 3) developed by the flip-flop 24 in FIG. 2.

As previously mentioned the setting and resetting of the flip-flops 39 to 41 in the D/A converter FIG. 6, is controlled by periodic timing pulses TP. These timing pulses may for example be generated in the printer control logic circuit 23. Such a source is symbolically shown in FIG. 8 as a free running source whose frequency of repetition is much higher than the sprocket pulse rate of the printer itself. As an example, the timing pulse source may be many times greater in frequency than the sprocket pulse source. As constructed the timing pulse source generates a recurrent pulse on each of the several taps shown in FIG. 8 as TP, TP+1 and TP+2. In operation, pulses periodically appear on the tap labeled TP and also on taps TP+1 and TP+2. The only difference between the pulses appearing on these taps is that those appearing on TP+1 appear later in time than those appearing on tap TP. Similarly, those pulses appearing on TP+2 occur time-delayed relative to both TP and TP+1. This timing of the TP pulses is graphically shown in FIG. 8a.

Returning now to FIG. 1, the rest of the control logic of the paper advance mechanism will now be described. As shown in this figure, the paper advance may typically be controlled from the input/output channel of a high speed computer. In particular, the printer is connected to the I/O channel of the computer via a data bus 52 and a control cable 51. The data bus 52 may, as a typical example, comprise eight parallel signal lines over which the computer will transmit to the printer either data or instructions in the form of an eight binary bit signal byte. The control cable 51 is made up of a group of signal lines which are energized by the computer in such a way as to control the operation of the printer. For example, when data is being transmitted on bus 52, one of the lines comprising cable 51 may be energized to indicate this fact to the printer. Similarly, when the signals appearing on the data bus 52 represent an instruction another one of the signal lines making up control cable 51 may be energized to indicate this fact to the printer. For example, when the computer issues an instruction telling the printer to advance paper n lines, one of the control lines making up cable 51 will be energized so that the signals indicating the number of lines of paper advance appearing on the data bus 52 can be gated into the lines-to-go register 48. Similarly when the computer instructs the printer as whether a 6 or 8 lines per inch mode is desired, another one of the signal lines comprising cable 51 will be energized to pick up the appropriate control line 53 or 54 to thereby control the printer format. Finally after all the data and instruction signals necessary to control the operation of the printer have been sent over the control cable 51 and data bus 52, the computer will issue a paper advance signal pulse over one of the lines making up the control cable 51. This signal pulse will momentarily energize line 55 for reasons soon to be explained and also set flip-flop 24 (FIG. 2).

As indicated above the instruction setting forth the number of lines of paper advance is transmitted to the printer via the data bus 52 and the line advance count portion of the instruction is gated into the lines-to-go register 48. For purposes of illustration this register is assumed to be a four bit parallel register so that line advance operations up to 16 lines of advance can be handled.

The number of lines to be advanced is stored in the register 48 and ultimately converted into a sprocket count which is jammed into the position error counter 46. In this regard it will be remembered that each line of paper advance corresponds to either 32 sprockets or 24 sprockets depending on whether a six or an eight line per inch format is being used. Thus the 4 bit output of the lines-to-go register 48 must be multiplied by either 24 or 32 before it is stored in counter 46. This action is obtained by an encoding multiplier 47 which translates the output from the lines-to-go register into an appropriate binary coded sprocket count. The binary coded output of the multiplying encoder 47 is fed through a binary adder 50, for reasons later to be explained, into the position error counter 46. The counter 46 which may typically be an 8 stage binary counter receives the 8 bit sprocket count output from the adder 50 under the control of the momentary advance pulse appearing on line 55. In more particular detail, after the lines-to-go register 48 has been loaded and the lines per inch mode selected, the computer issues an advance signal over cable 51. This signal actuates line 55 to gate the output of the adder 50 into the counter 46 and also sets flip-flop 24. Flip-flop 24 in turn actuates line 21 which activates the accelerate-decelerate control 11.

The sprocket count now contained in counter 46 is continuously gated into the error register 29 by suitable TP timing pulses. The D/A converter 15 detects the error count stored in the error register 29 and starts the tractor motor 1 as previously described. As the tractor motor rotates to move paper the sprocket generator generates a sprocket signal every 5 mils of paper movement. These sprocket pulses pass through the motion detect circuit 49 to decrement the sprocket count contained in the position error counter 46 and error register 29. This action continues until the position error counter 46 and hence error register 29 have been decremented to zero, at which time the target velocity output of the digital-to-analog converter 15 reduces to zero and the paper is brought to a stop.

The position error register 29 is used in conjunction with the adder 50 to provide an initial correction to the paper advance sprocket count. In particular, the counter 46 which is a reversible counter can be manually incremented or decremented by operation of a manual switch 56 so that counter 46 can be set to contain an initial count other than zero. Also as the servo network 8 and/or the D to A converter 15 degrades with age, the paper advance may stop with a residual count left in counter 46 other than zero. Then when the computer issues its advance signal the initial or residual count contained in counter 46 and also register 29 is passed through adder 50 together with the sprocket count obtained from the multiplier 47 from the lines-to-go register 48. The sum of the sprocket counts obtained from the adder 50 is then jammed into the counter 46 and hence in register 29. This represents the total sprocket count for the ensuing paper advance.

The manual control of the sprocket count is of value for example when the operator feels that some correction to the paper alignment is desired. In such a case, the operator can then either increment or decrement the count in the position error counter 46 by the operation of the manual switch 56 an appropriate number of times to correct for the misalignment. For example, he may observe that the average stop position of the paper is a sixteenth of an inch short of the desired stop position. In this case he may push the manual switch 56 twelve times to increment the counter by twelve. Then when the next paper advance signal arrives, a count of twelve would be added to the sprocket count represented by the lines-to-go register setting.

Referring now to FIG. 9 a typical decoding multiplier 47 will be described. As will be recalled the multiplier is used to translate the line count stored in the lines-to-go register 48 into a sprocket count before it is stored in the position error counter 46. To this end the line count stored in binary form in the lines-to-go register 48 must be multiplied by either 24 or 32 depending on whether an eight or a six line per inch advance mode is selected.

For purposes of simplification it will be assumed that the lines-to-go register 48 is a four bit register and it will be further assumed that the system allows a maximum of ten lines of advance when the printer is in its eight line per inch mode and a maximum of seven lines of advance when the printer is in its six lines per inch mode.

As shown in FIG. 9 the multiplier 47 includes a conventional decoder 60 which has ten output lines, one for each of the ten lines of paper advance assumed to be allowed by the system. In particular, any of the decimal numbers one to ten may be stored in binary form in register 48 which in turn causes decoder 60 to energize the corresponding output line 1 to 10. The ten output lines from the decoder 60 are connected through a first set of "OR" gates 61a to 65a and a first set of "AND" gates 61 to 65 to the number four through number eight output terminals of the multiplier. Similarly the ten output lines of the decoder 60 are connected through a second set of "OR" gates 66a through 68 a and a second set of "AND" gates 66 through 68 to the number six through number eight output terminals of the multiplier. It will be noted that it is assumed that the adder 50 which receives the output from the multiplier 47 is an eight bit parallel adder and that the output terminals number 4 through number 8 from the multiplier 47 represent the corresponding bit positions of the adder input. Bit position numbers 1 to 3 from the multiplier are not shown but are assumed in the present example to have binary zeros jammed into them. It will be understood, however, that bits 1 to 3 can be generated in the same manner as is illustrated in FIG. 9.

The first set of "AND" gates 61 to 65 are conditioned from the reset output of a flip-flop 69, while the second set of "AND" gates 66 through 68 are conditioned from the set output of the flip-flop 69. Flip-flop 69 is triggered to its set condition by a signal on input line 53 when a six line per inch mode is selected and is triggered to its reset condition by a signal on its input conductor 54 whenever an eight line per inch mode is selected.

In operation assume first that a six line per inch mode is selected. Flip-flop 69 is triggered to its set condition and gates 66 through 68 are active while gates 61 through 65 are blocked. Now assume that a one line advance is stored in register 48. This causes the decoder 60 to energize its number one output line which in turn applies a signal to "AND" gates 61, 62 and 66 via "OR" gates 61a, 62a and 66a respectively. Of these gates only gate 66 is rendered active by flip-flop 69 and hence only the output line number 6 from the multiplier 47 is energized. This corresponds to the binary condition 00100000 which equals decimal 32 and which in turn corresponds to a sprocket error count of 32. Now assume that a three line advance is selected. In this case the decoder energizes its number 3 output line to apply a signal to "AND" gates 61, 64, 66 and 67 via "OR" gates 61a, 64a, 66a and 67a respectively. Again with flip-flop 69 in its set condition only "AND" gates 66 and 67 are active while "AND" gates 61 and 64 are blocked. This will cause the number six and number seven output lines from the multiplier 47 to be energized. This then corresponds to the binary condition 01100000 which in turn equals the decimal value 96 (the sprocket error count for a three line advance when the printer is set to its six line per inch mode).

Now assume that the flip-flop 69 has been triggered to its reset condition for an eight line per inch mode and further assume that a three line advance has been chosen. This time flip-flop 69 energizes gates 61 and 64 and blocks gates 66 and 67. The decoder 60 output on line 3 then passes through gates 61 and 64 to energize the number four and number seven output lines of the multiplier 47. This corresponds to the binary value 01001000 or decimal 72 which in turn is the sprocket error count for a three line advance when the printer has been set to its eight line per inch mode.

Reference is now made to FIG. 10 where the sprocket pulse generator is shown in more detail. Typically, the sprocket pulse generator may comprise a transparent disk 5 on which a series of 192 opaque marks 5a have been formed. Separating the opaque areas 5a are 192 transparent areas 5b. The disk 5, as shown in FIG. 1, is coupled by shaft 4 to the tractor motor 1 and is rotated thereby. A light source 6 is located on one side of the disk 5 and a pair of light sensitive elements such as light sensitive diodes 7a and 7b are located on the other side of the disk. The diodes 7a and 7b are positioned so that as the disk is rotated the light from source 6 will periodically impinge on both diodes 7a and 7b but at different times.

For example, by positioning the diode 7a so that it is at the mid-point of a transparent area 5b at the same time that diode 7b is just entering a transparent area 5b, a phase quadrature relation will be produced between the signals produced by the outputs of diodes 7a and 7b. This relationship is shown in FIG. 11, where the output from diode 7a is represented by the channel A output signal after it has been amplified and shaped by circuit 7a' and the output from the diode 7b is represented by the channel B output signal after it has been amplified and shaped by the circuit 7b'. Since there are 192 transparent areas 5b and 192 opaque areas 5a contained on the disk 5 there will be 192 channel A and 192 channel B signal cycles per revolution of the disk 5. To produce a sprocket signal of 768 sprocket pulses per revolution of the disk 5 then, it is necessary to break each cycle of the channel A or B signals down into four parts (4 × 192 = 768). This is done by the motion control circuit shown in FIG. 12 which will be described. This circuit recognizes the four combinatorial channel A and B signal levels shown and numbered 1 to 4 in FIG. 11 as four sprocket pulses.

Reference is now made to FIG. 12 where it can be seen that the channel A signal controls the setting and resetting of a first flip-flop 75 of a pair of flip-flops 75 and 76, while the channel B signal controls the setting and resetting of the second flip-flop 76 of the pair of flip-flops. In more particular, the channel A signal is applied via lead 77 and an "AND" gate 75a to the "1" input of flip-flop 75 and also through inverter 75c and "AND" gate 75b to the "0" input of flip-flop 75. The channel B signal is similarly connected via lead 78, "AND" gates 76a and 76b and inverter 76c to the "1" and "0" inputs of flip-flop 76. Connected in parallel to all of the "AND" gates 75a, 75b, 76a and 76b is a timing pulse TP such as shown in FIG. 8a. Flip-flop 75 will thus be set by the TP pulse to its "1" state whenever the channel A signal is high and to its "0" state whenever the channel A signal is low. Similarly, flip-flop 76 will be set by the TP pulse to its "1" state whenever the channel B signal is high and to its "0" state whenever the channel B signal is low. Thus the flip-flops 75 and 76 will be set to the "1", "0" combination during the No. 1 sprocket period of FIG. 11; to the "1", "1" combination during sprocket period No. 2; to the "0", "1" combination during the sprocket period No. 3 and finally to the "0", "0" combination during the sprocket period No. 4.

The 1 and 0 outputs of the first pair of flip-flops are applied respectively through "AND" gates 79a, 79b, 80a and 80b to the 1 and 0 inputs of a second pair of flip-flops 79 and 80 as shown. The gates 79a, 79b, 80a and 80b are strobed by a delayed timing pulse such as TP+2 so that the "1" or "0" condition of flip-flop 79 and 80 reproduce the "1" and "0" condition of flip-flops 75 and 76 but at a time which is delayed from the setting of the flip-flops 75 and 76. Thus by comparing the settings of the first pair of flip-flops 75 and 76 at time TP+1 (which is intermediate the TP and TP+2 timing) relative to the setting of flip-flops 79 and 80 it can be determined whether the sprocket disk 5 is rotating in one direction or in the other and thus whether the sprocket counter 46 of FIG. 1 should be incremented or decremented. For example, if at TP+1 the first pair of flip-flops 75 and 76 are set to their No. 1 sprocket condition, and the second pair of flip-flops 79 and 80 are still in their No. 4 sprocket pulse condition, the sprocket disk 5 is moving in a forward direction and the counter 46 should be decremented. If, however, at time TP+1 the first pair of flip-flops 75 and 76 are set to their No. 1 sprocket condition and the second pair of flip-flops are still in their No. 2 sprocket condition then it is known that the disk 5 is rotating in the reverse direction and the counter 46 (FIG. 1) should be incremented.

To compare the settings of the first pair of flip-flops 75 and 76 with the settings of the second pair of flip-flops 79 and 80, a first decoder 82 is connected to the outputs of the first pair of flip-flops 75 and 76 and a second decoder 83 is connected to the outputs of the second pair of flip-flops 79 and 80. Each of these decoders are conventional in character and each has four outputs associated therewith. The outputs from decoder 82, for example, are labeled 1 to 4 and are arranged so that its No. 1 line is energized when the flip-flop pair 75 and 76 are set to their No. 1 sprocket condition as shown in FIG. 11. Similarly, the No. 2 output line is energized when the flip-flop pair 75 and 76 are set to their No. 2 sprocket condition (FIG. 11) and so on. The decoder 83 is similarly connected with respect to the flip-flop pair 79 and 80. The outputs from this decoder, however, are labeled 1' to 4' to distinguish it from decoder 82.

The No. 1 output of decoder 82 is connected together with the No. 4' output of decoder 83 to the inputs of a first decrementing gate 84a. There are four such decrementing gates 84a to 84d and each decrementing gate is connected to a different one of the outputs No. 1 to No. 4 of decoder 82 and to a different one of the outputs No. 1' to 4' of decoder 83 in the manner shown. Similarly, the No. 1 output of decoder 82 together with the output No. 2' of decoder 83 is connected to the inputs of a first incrementing gate 85a. Again, there are four such incrementing gates 85a to 85d and each incrementing gate is connected to a different one of the outputs No. 1 to No. 4 of decoder 82 and to a different one of the outputs No. 1' to No. 4' of decoder 83 again in the manner shown. The operation of the decrementing gates 84a to 84d is such that whenever the disk 5 is rotating in its forward direction one of the decrementing gates will be activated during the period TP to TP+2. Similarly, whenever the disk 5 is rotating in its reverse direction one of the incrementing gates 85a to 85d will be actuated during the interval TP to TP+2. To complete the circuit description, each of the outputs from the decrementing gates 84 are fed through a buffer 74 to an "AND" gate 72. Similarly, each of the outputs from the incrementing gates 85 are fed through a buffer 75 to an "AND" gate 73. The "AND" gates 72 and 73 are then strobed in parallel by a TP+1 timing pulse to thus provide either a decrementing pulse on line 86 or an incrementing pulse on line 87.

To permit manual incrementing or decrementing of the counter 46, an operator controlled switch 56 is provided together with a pulser 70 and an operator controlled increment or decrement switch 71. Whenever, the operator wishes to increment or decrement the counter 46 to thus provide for slight line position adjustments, he can set the switch 71 to its increment or decrement positions and operate the switch 56 a number of times according to the amount of paper adjustment desired. It will be remembered that each actuation of the switch 56 will produce approximately 5 mils of paper movement.

What is claimed is:

1. A paper advance mechanism for a high speed printer, comprising a servo means for moving the printer paper, a sprocket generator coupled to said servo means adapted to generate a multiplicity of sprocket pulses for each line of paper advance, a counter for storing a count which is a predetermined multiple of the lines of paper advance, a register means coupled to said counter for receiving the count stored in said counter, a digital-to-analog converter coupled to said register means for developing an error voltage dependent on the count stored in the register means and for applying said error voltage to said servo means to cause said servo to advance paper, an adder network having two inputs thereto and a summing output, one of said adder inputs being connected to the output of said register means, an input means connected to the other adder input for applying a count signal indicative of the number of lines of paper advance that is to be executed, the summing output of said adder being connected to the input to said counter to load said counter with a count at the start of a paper advance operation, and means utilizing the output of said sprocket pulse generator to decrement said counter as paper is advanced.

2. The system of claim 1 wherein said input means comprises a lines-to-go register that stores a signal indicative of the number of lines it is desired to advance paper and a multiplier that multiplies the number stored in said lines-to-go register by said predetermined multiple.

3. The system of claim 2 wherein there is included means for changing said predetermined multiple.

4. The system of claim 1 wherein said digital-to-analog converter generates an error voltage whose magnitude varies as a square root function of the count remaining in said register means.

5. The system of claim 4 wherein said input means comprises a lines-to-go register that stores a signal indicative of the number of lines it is desired to advance paper and a multiplier that multiplies the number stored in said lines-to-go register by said predetermined multiple.

6. The system of claim 5 wherein there is included means for changing said predetermined multiple.

7. The system of claim 1 wherein the last-named means includes a further means for manually incrementing or decrementing the count held in said counter.

8. A drive system for positioning a movable member to any of a plurality of discrete stop positions, comprising: a servo mechanism for moving said movable member, a sprocket pulse generator coupled to said servo mechanism, said sprocket generator being operative to produce a series of sprocket pulses as the movable member is moved by said servo mechanism from one stop position to another, a counter, a digital register for storing the count held in said counter, a digital-to-analog converter coupled to the output of said register for developing a signal voltage indicative of the count stored in said register, means utilizing the signal voltage from said digital-to-analog converter to actuate said servo mechanism, a signal input means for delivering a digital signal indicative of the number of stop positions through which said movable member is to be moved, an adder network having two inputs thereto and a summing output, one of said adder inputs being connected to said signal input means, the other of said adder inputs being connected to the output of said register, the summing output of said adder being connected to said counter to load said counter with a count which is equal to the count signal supplied by said signal input means plus the count stored in said register, and means utilizing the output of said sprocket pulse generator to decrement said counter.

9. A drive system for positioning a movable member to any of a plurality of discrete stop positions, comprising; a servo means coupled to said member for moving the same to any of said stop positions, said servo means having acceleration and brake inputs for controlling the operation thereof, a sprocket pulse generator coupled to said servo means for generating sprocket pulses as said member is moved from one stop position to the next, a storage means for storing a digital count indicative of the number of stop positions through which the movable member is to be moved, a digital-to-analog converter connected to said storage means for generating a reference voltage whose amplitude varies in accordance with the digital count held by said storage means after said count drops below a predetermined value, means utilizing the sprocket pulses generated by said sprocket pulse generator for decrementing the digital count held in said storage means as said member is moved toward its desired stop position, a voltage generating means coupled to said servo means for generating a voltage whose amplitude varies as a function of the velocity of said member, a voltage comparator coupled to receive the output from said voltage generator and said digital-to-analog converter and to generate an error signal in accordance with the difference between said voltages, signal switching means, including a first signal path for coupling the error voltage to the acceleration input of said servo means whenever the output of said voltage generator drops below the digital-to-analog reference voltage and a second signal path for coupling the error voltage to the brake input of said servo means whenever the output voltage from said voltage generator rises above the reference voltage output of the digital-to-analog converter, and means rendering the second signal path operative only when the digital count stored in said storage means drops below said predetermined value.

* * * * *